Dec. 4, 1934. B. A. VAN WORMER 1,983,421
SAWING MACHINE
Filed Nov. 24, 1933 4 Sheets-Sheet 1

Inventor
*Bernard A. Van Wormer*

By *Geo. P. Kimmel*
Attorney

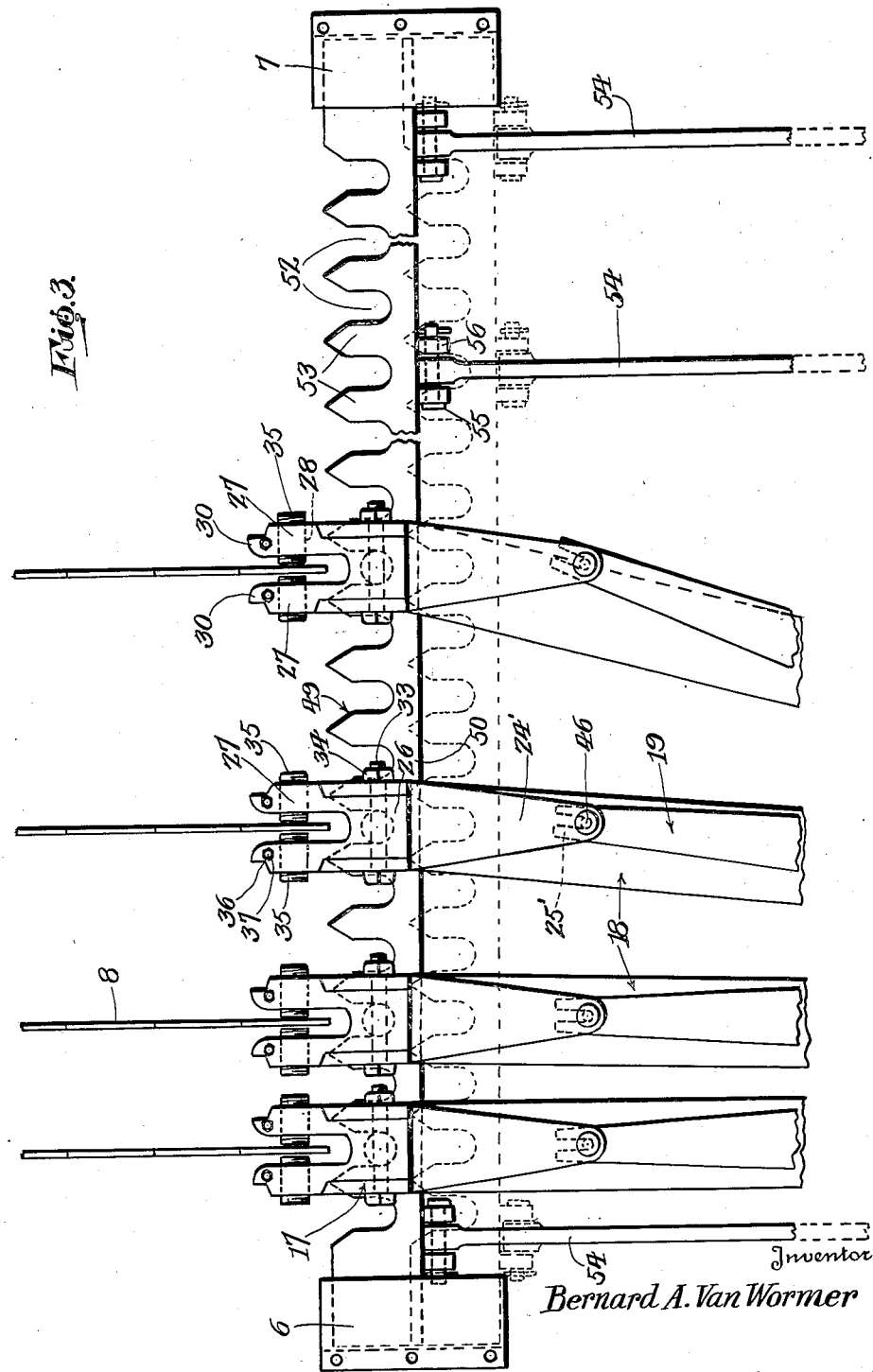

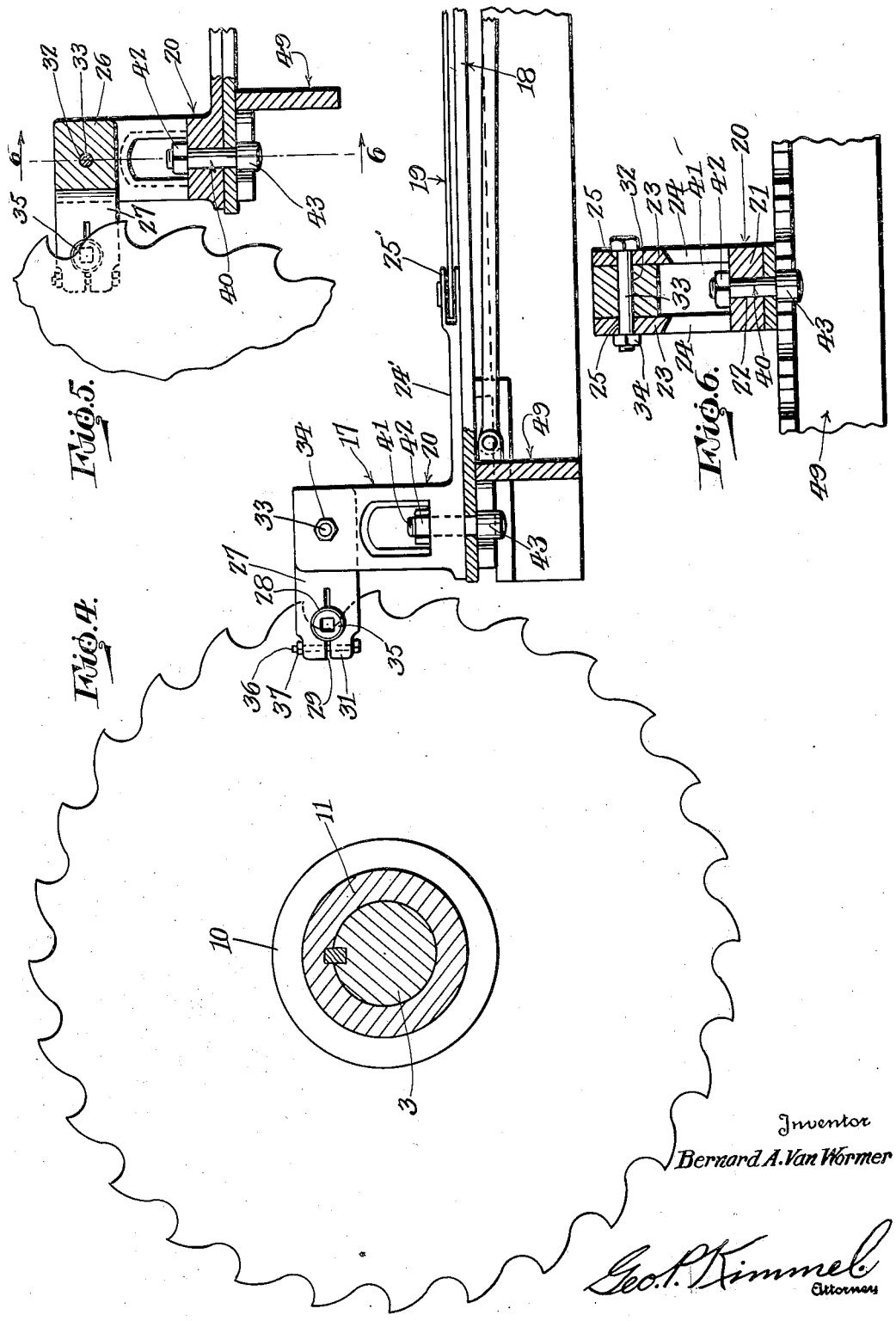

Dec. 4, 1934.  B. A. VAN WORMER  1,983,421
SAWING MACHINE
Filed Nov. 24, 1933  4 Sheets-Sheet 4
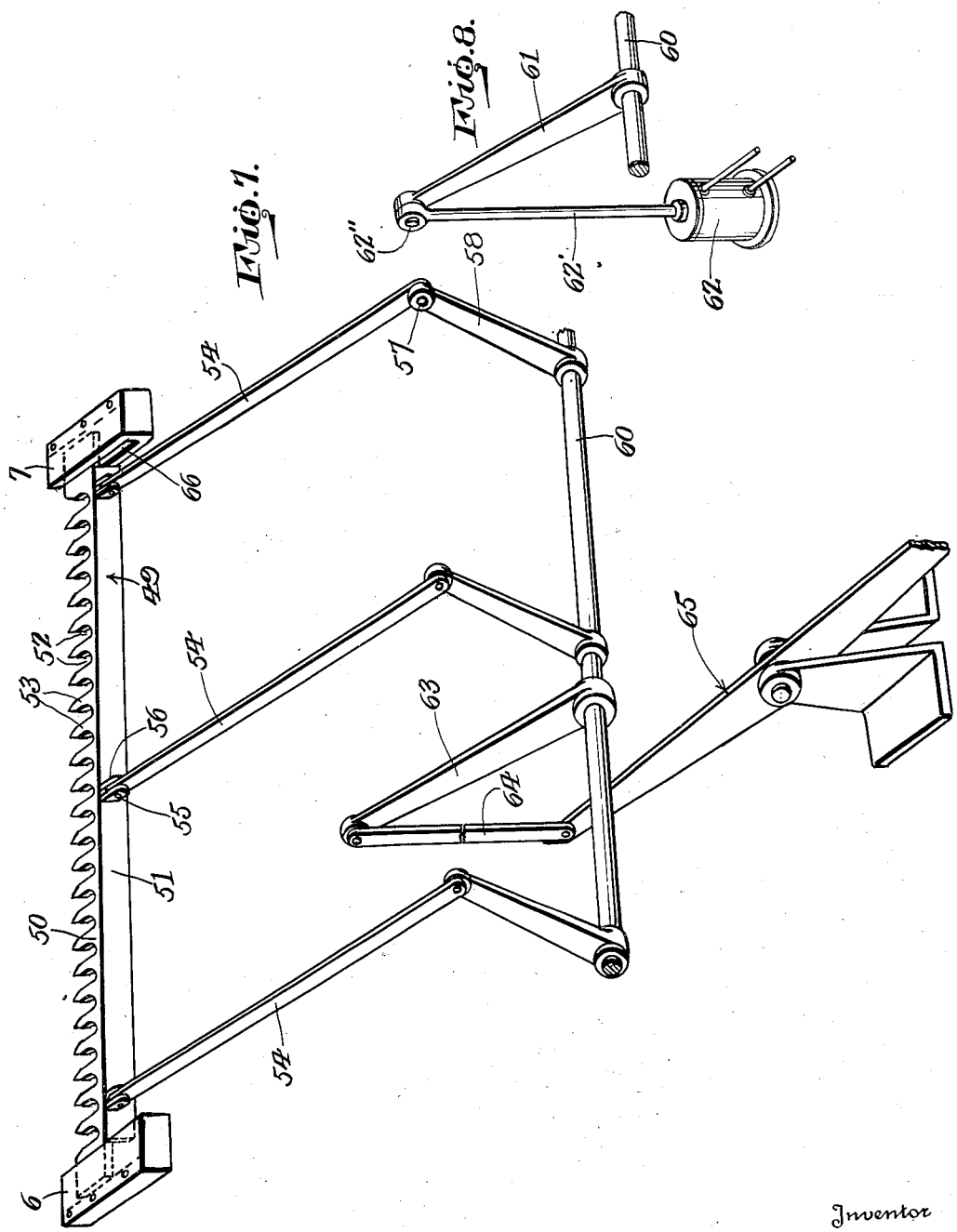
Inventor
*Bernard A. Van Wormer*
By *Geo. P. Kimmel*
Attorney Patented Dec. 4, 1934

1,983,421

UNITED STATES PATENT OFFICE 1,983,421

SAWING MACHINE

Bernard A. Van Wormer, La Grande, Oreg.

Application November 24, 1933, Serial No. 699,597

6 Claims. (Cl. 143—37)

This invention relates to a sawmill or sawing machine of the edger type employing a gang or gangs of adjustable saws and adjustable guides for the latter, and has for its object to provide, in a manner as hereinafter set forth, new and improved locking means for the guides to insure for the operation of the saws at the points to which they have been adjusted.

A further object of the invention is to provide, in a manner as hereinafter set forth, a sawing machine of the edger type including a new and improved horizontally movable notched bar coacting with coupling means between the adjustable saw guides and adjustable edger levers of the machine for locking said guides and levers in adjusted position.

A further object of the invention is to provide, in a manner as hereinafter set forth, a machine of the type referred to including new and improved guides for the saws.

A further object of the invention is to provide, in a manner as hereinafter set forth, a machine of the class referred to including a horizontally adjustable element for maintaining the saw guides from shifting from their adjusted positions during the operation of the saws.

A further object of the invention is to provide a machine of the class referred to, in a manner as hereinafter set forth, including a horizontally adjustable keeper element common to a bank of four saws when the machine is operating as a single edger and to a bank of eight saws when operating the machine as a double edger.

A further object of the invention is to provide, in a manner as hereinafter set forth, a machine of the class referred to including a horizontally adjustable keeper element associated with the adjustable saw guides and edger levers for locking them in set position and with the bar acting as a support for the edger levers upon which are directly seated the saw guides.

A further object of the invention is to provide, in a manner as hereinafter set forth, a machine of the class referred to, including adjustable saw guides coupled to edger levers, and for utilizing the coupling means between the guides and levers to coact with a horizontally adjustable keeper element for locking the guides in adjusted position to prevent any shifting thereof during the operation of the saws.

A further object of the invention is to provide, in a manner as hereinafter set forth, a machine of the class referred to, including saw guides, edger levers, connections between the guides and levers, retaining means for the guides mounted on the levers and connected to the guides, a horizontally movable notched bar and with the said pivot connections coacting with the bar for locking the guides and levers in adjusted position.

Further objects of the invention are to provide, in a manner as hereinafter set forth, a machine of the class referred to, which is simple in its construction and arrangement, strong, durable, compact, thoroughly efficient in its use, formed of parts materially less in number than that of the edger machines now in general use, conveniently controlled for locking the saws, saw guides and edger levers in adjusted position, readily assembled, and comparatively inexpensive to manufacture.

To the above ends essentially and to others which may be hereinafter set forth, the invention consists of such parts, and such combination of parts which fall within the scope of the invention as claimed.

In the drawings:

Figure 3 is a fragmentary view in plan, broken away and showing the notched bar, saws and guides for the latter.

Figure 4 is a fragmentary view of the machine in longitudinal section and illustrating a saw guide in side elevation.

Figure 5 is a detail showing a saw guide in vertical section.

Figure 6 is a sectional view on line 6—6 Figure 5.

Figure 7 is a perspective view of the notched bar, the mechanism for moving it horizontally and a modified form of prime mover for said mechanism.

Figure 8 is a fragmentary view in perspective of the preferred form of prime mover for the mechanism for shifting the notched bar and illustrating the steam or air cylinder and its connection with said mechanism.

Figure 1:
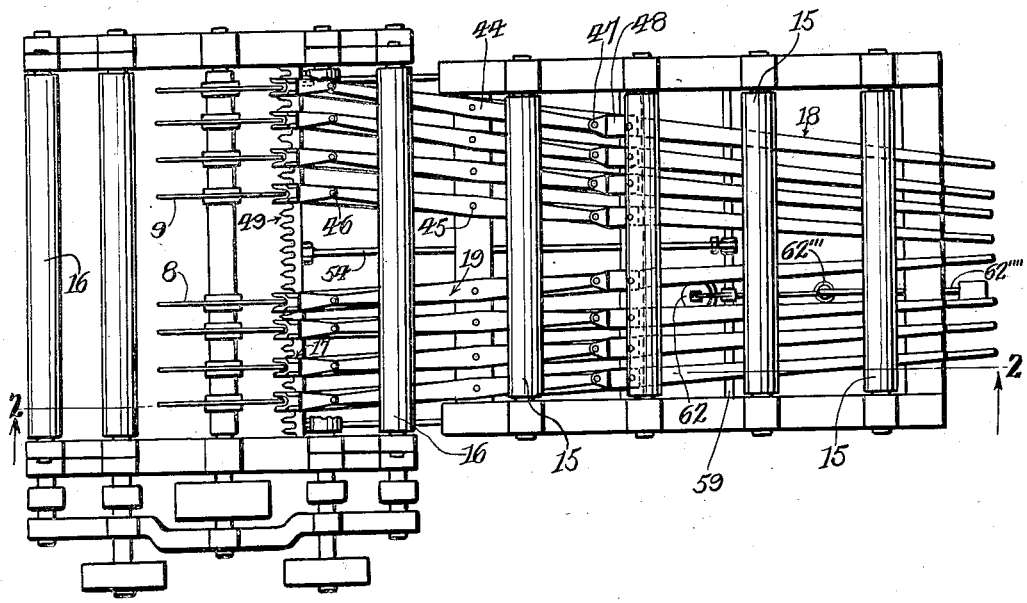
Figure 1 is a top plan view of a sawing machine of the edger type in accordance with this invention.

In the drawings, 1 indicates a supporting structure of frame-like form having bearings 2 located below the top of structure 1 and in which are journaled a driven arbor 3. Supported from the top of frame at the front and back of structure 1 are arranged driven feed rolls 5. Arranged within structure 1 and positioned in parallel spaced relation are a pair of oppositely disposed guides 6, 7 which are arranged below and forwardly with respect to arbor 3. Two spaced gangs of edger saws are designated 8, 9. Each saw has projecting from each side a collar 10 and also a bushing 11 at its axis. The bushings are mounted on the arbor 3. Each saw of a gang is laterally shiftable upon arbor 3 but revolves bodily with the latter. Positioned at the front of and of less height than that of structure 1 is a table 12 of skeleton form provided with transversely extending spaced parallel flat supporting members 13, 14. The table 12 at its top is provided with rotatable supporting rolls 15. The frame 1 has supported from the front and rear thereof press or retaining rolls arranged over the rolls 5 in spaced relation.

There is associated with each saw of a gang a guide or goose-neck element 17. There is associated with each element 17 an edger lever 18 and a shifter device 19 arranged over and of less length than the lever.

The element 17 is arranged over the saw end of lever 18 and it consists of a vertically disposed U-shaped casing 20 having a thick base 21 formed with a vertical opening 22. The arms of casting 20 are indicated at 23 and provided with opposed enlarged openings 24 so that access can be had to the interior of the casting. The arms 23 above openings 24 are formed with aligning openings 25 of less area than the opening 24. The bottom of casting 20 has a forwardly directed arm 24' provided with a bifurcated outer end 25'. Positioned between and extending from the upper ends of arms 23 is a bifurcated guide block 26 having each of its arms 27 provided with an opening 28 intersected by a lengthwise extending slot 29 of less length than and having its open end at the outer end of the arm. The openings 28 align and the walls thereof are threaded. The outer end portions of the arms 27 are reduced as at 30. Each reduced end is formed with an opening 31 disposed at right angles to and intersected by a slot 29. The inner end of block 26 is formed with an opening 32 which is parallel to openings 28 and aligns with openings 25. Extending through the aligning openings 25, 32 is a headed bolt 33 carrying a securing nut 34. The latter when screwed home coacts with the head of bolt 33 and the arms 23 for clamping block 26 stationary. When nut 34 is loose, the block 26 may be swung outwardly on bolt 33 from the position shown in Figures 4 and 5 to clear the saw. Threadedly engaging with the wall of each opening 28 is a peripherally threaded combined saw guide and saw shifting member 35. The members 35 are adjustable and disposed in endwise opposed spaced relation. Between the inner ends of members 35 travels the saw during the edging operation. The members not only act as saw guides, but further function to shift the saw laterally on arbor 3 when desired. To prevent the shifting of members 35 when adjusted, a binding means is provided for each. The said means consists of a headed bolt 36 extending upwardly through an opening 31 and carrying on its upper end a securing nut 37. The latter when screwed home and in connection with the head of bolt 36 draws the slit 29 together whereby the wall of an opening 28 is caused to tightly clamp with a member 35. The active position of element 17 is as shown in Figures 4 and 5.

The edger lever 18 consists of an elongated flat bar 38 seated upon and projecting beyond the members 13, 14 and pivotally connected as at 38'. The saw end of bar 38 is formed with an opening 39. The element 17 is mounted upon the saw end of bar 38 in a manner to align opening 23 with opening 39. Associated with each element 17 and its associated edger lever 18 is a combined coupling and retainer element 40 for element 17 and lever 18. The element 40 not only couples element 17 to and upon the saw end of lever 18 but further functions as a pivot for element 17 to enable the latter to shift upon lever 18. The element 40 forms a part of the locking mechanism for locking lever 18 and element 17 in adjusted position. The other parts of the locking mechanism will be hereinafter referred to. The element 40 consists of bolt 41 and a securing nut 42. The bolt 41 has an enlarged head 43. The bolt 41 is extended upwardly through the aligning openings 39 and 23 in the lever 18 and base 21 of casting 20. The nut 42 is mounted on the upper end of bolt 41 and opposes the top of base 21. The head 43 abuts the lower face of lever 18.

The shifter device 19 for element 17 is for the purpose of moving the latter about element 40 upon lever 18 when the latter is disposed at an angle to element 17 or in other words the shifter device 19 maintains element 17 straight at all times irrespective of the position of element 17. The shifter device 19 consists of a lever 44 pivoted intermediate its ends, as at 45 to lever 18, has its saw end pivotally connected, as at 46 to the bifurcated end 25' of arm 24', and has its outer end pivotally connected as at 47 with a bracket 48 connected with table 12.

The element 40 when active locks or retains its associated element 17, the edger lever 18 associated with element 17 and a saw in rigid position for the operation of the saw. The elements 40 are disposed in the path of a horizontally movable notched bar which is common to the saws of the gangs and all of the elements 17. The elements 40 are adapted to pass into the notches of the bar and when in such positions coact with the side walls of the notches to lock or retain the elements 17 in their adjusted position. The element 40 forms one part and the notch bar forms the other part of the locking mechanism. The notch bar will be termed a keeper element for the retainer elements 40. The notched bar is generally indicated at 40 and is of angle-shaped cross section to provide a vertical and a horizontal leg 50, 51 respectively. The leg 50 extends rearwardly from and at right angles to the upper end of the leg 51. The leg 50 is of greater length than and extends from each end of the leg 51. The leg 50 is formed transversely with a series of spaced notches 52 of a contour to provide a row of teeth 53 having tapered free ends. The notches 52 receive the elements 40 for locking the saws in their adjusted positions. The leg 50 has its ends mounted in and slidably supported by the guides 6, 7.

Figure 2:
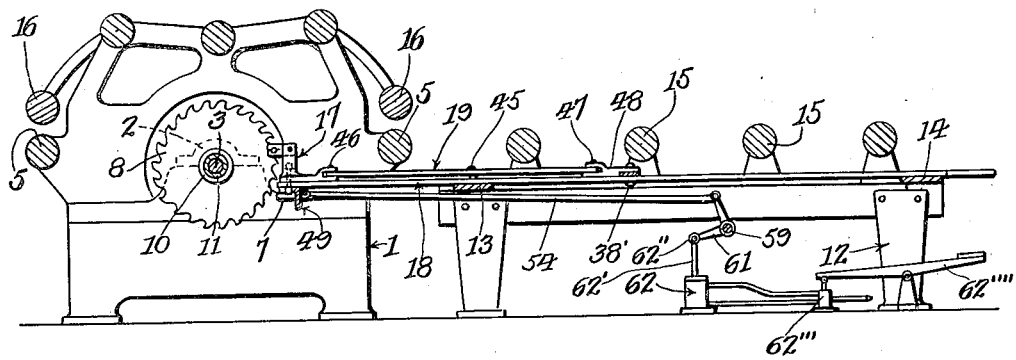
Figure 2 is a longitudinal sectional view on line 2—2 Figure 1.

A reciprocatory mechanism is provided for the keeper element which functions to move said keeper element in a horizontal path. The said mechanism includes a plurality of parallel spaced links 54, each having its rear end pivotally connected, as at 55 to a pair of spaced lugs 56 on the front face of leg 51 of the notched bar 49. The outer ends of the links are pivotally connected as at 57 to a plurality of crank arms 58 carried by a rock shaft. In Figure 2 the rock shaft is designated at 59 and in Figure 7 at 60. With reference to Figure 2, shaft 59 is provided with a crank arm 61 operated from an air or strain pressure operated prime mover consisting of a cylinder 62 carrying a piston element 62' pivotally connected as at 62'' to the crank arm 61. Cylinder 62 is controlled by a valve structure 62''' operated from a foot pedal 62''''. With reference to Figure 7 the shaft 60 carries a crank arm 63 connected by a link 64 to a foot operated prime mover 65. The movement of the notch bar or keeper element in a direction away from the saws is limited, due to the construction of the guides 6, 7, these latter being so formed as to close the outer ends of the grooves 66 thereof to provide stops. The inner ends of the grooves 66 are open, Figure 7.

The keeper element which is provided by the notch bar extends transversely of the machine, and the notches thereof are spaced predetermined distances apart corresponding to a predetermined scale of dimensions for cuts in the lumber. The elements 17, levers 18 and elements 40 are bodily shifted relative to the keeper element, after the latter has been moved away from the saws to positions for the purpose of insuring cuts of the saws within the range of the predetermined scale, and after being so shifted the keeper element is moved toward the saws to encompass the elements 40 which securely lock the elements 17 and levers 18 in their adjusted position. The levers 18 are shifted from the front of the machine by the attendant. Each element 17 and its associated edger lever 18 bodily move together, due to the coupling of one to the other by an element 40 and are independently adjustable with respect to the other elements 17 and levers 18.

What I claim is:

1. In a sawing machine of the edger type, a saw guide element comprising a yoke-shaped body provided with an opening in its base for the passage of means to couple it upon an edger lever, a block arranged between and extended from the arms of said body, a combined pivot and holdfast means between said block and arms, said block being bifurcated to form a pair of arms, each of the arms of the block being formed with an opening intersected by a slit disposed lengthwise thereof, a pair of endwise opposed adjustable combined guide and saw shifter members threadedly engaging with the walls of said openings, and means carried by the arms of the block for binding said members to the walls of said openings.

2. In a sawing machine of the edger type, an adjustable edger lever provided with an opening at its saw end, a combined saw guide and adjuster element seated upon said end and bodily movable horizontally in a straight path on the adjusting of said lever, said element being formed with an arm positioned over said lever, means pivoted to said arm and to said lever for preventing the shifting of said element relative to the lever on the adjusting of the latter, a vertically disposed combined connector and pivot device disposed within and axially of the lower portion of said element, depending from the latter and extending through said opening to below said lever, said device having an enlarged upper part bearing against a horizontal surface portion intermediate the ends of said element and an enlarged lower part bearing against the lower face of said lever, said device coupling said element and lever together and providing a pivot for the saw end of the lever, and an oppositely horizontally movable structure shiftable to and from the saw end of the lever, arranged below said lever and being formed with horizontally disposed means for receiving the enlarged lower end part of said device for locking said lever in adjusted position to maintain said element in the position to which it has been moved to by the lever.

3. In a sawing machine of the edger type, an adjustable edger lever provided with an opening at its saw end, a combined saw guide and adjuster element seated upon said end and bodily movable horizontally in a straight path on the adjusting of said lever, said element being formed with an arm positioned over said lever, means pivoted to said arm and to said lever for preventing the shifting of said element relative to the lever on the adjusting of the latter, a vertically disposed combined connector and pivot device disposed within and axially of the lower portion of said element, depending from the latter and extending through said opening to below said lever, said device having an enlarged upper part bearing against a horizontal surface portion intermediate the ends of said element and an enlarged lower part bearing against the lower face of said lever, said device coupling said element and lever together and providing a pivot for the saw end of the lever, and an oppositely horizontally movable structure shiftable to and from the saw end of the lever, arranged below said lever and being formed with horizontally disposed means for receiving the enlarged lower end part of said device for locking said lever in adjusted position to maintain said element in the position to which it has been moved to by the lever, and a pair of combined supporting, stop, and guiding means for and having spaced parts of said structure extended therein.

4. In a sawing machine of the edger type, an adjustable edger lever provided with an opening at its saw end, a combined saw guide and adjuster element directly seated upon said end and bodily movable horizontally in a straight path on the adjusting of said lever, said element having axially thereof in its lower portion an opening registering with said other opening, said element being formed with an arm arranged over and being free of direct connection to said lever, means pivoted to said arm and to said lever to prevent the shifting of said element relative to the lever on the adjusting of the latter, a vertically disposed combined connector and pivot device extending through said aligning openings, said device having an enlarged upper end part bearing against a horizontal surface portion of said element intermediate the ends of the latter and an enlarged lower end part bearing against the lower face of the lever, said device coupling said element and lever together and forming a pivot for the latter, and an oppositely horizontally movable angle-shaped bar shiftable to and from the saw end of said lever, arranged below the latter and formed with a horizontally disposed leg provided with means for receiving said enlarged lower end part of said device for locking said lever in adjusted position to maintain said element in the position to which it has been moved to by the lever.

5. In a sawing machine of the edger type, an adjustable edger lever provided with an opening at its saw end, a combined saw guide and adjuster element directly seated upon said end and bodily movable horizontally in a straight path on the adjusting of said lever, said element having axially thereof on its lower portion an opening registering with said other opening, said element being formed with an arm arranged over and being free of direct connection to said lever, means pivoted to said arm and to said lever to prevent the shifting of said element relative to the lever on the adjusting of the latter, a vertically disposed combined connector and pivot device extending through said aligning openings, said device having an enlarged upper end part bearing against a horizontal surface portion of said element intermediate the ends of the latter and an enlarged lower end part bearing against the lower face of the lever, said device coupling said element and lever together and forming a pivot for the latter, and an oppositely horizontally movable angle-shaped bar shiftable to and from the saw end of said lever, arranged below the latter and formed with a horizontally disposed leg provided with means for receiving said enlarged lower end part of said device for locking said lever in adjusted position to maintain said element in the position to which it has been moved by the lever, and a pair of oppositely disposed combined supporting, stop, and guiding means for the ends of said bar.

6. In a saw machine of that type including an adjustable edger lever and a horizontally movable notched bar below the lever, a combined saw guide and adjuster element adapted to be seated upon the saw end of the edger lever, said element including a vertical part having its lower portion provided with a slot and an axially arranged opening extending from the base of the slot to the lower end of said part, and a combined connector and pivot device extending through said opening and of a length for extending through the saw end of said lever, said device formed with an enlarged upper end for bearing against the base of the slot and an enlarged lower part adapted to be positioned below said lever for engagement by the notched bar.

BERNARD A. VAN WORMER.